United States Patent
Wei et al.

(10) Patent No.: US 12,191,754 B2
(45) Date of Patent: Jan. 7, 2025

(54) METHOD AND DEVICE FOR SUPPRESSING NARROW PULSE, AND BRIDGE SWITCHING CIRCUIT

(71) Applicant: TIANJIN EMAGING TECHNOLOGY CO., LTD., Tianjin (CN)

(72) Inventors: Qing Wei, Tianjin (CN); Shenping Hong, Tianjin (CN); Honglei Sha, Tianjin (CN); Tianye Yu, Tianjin (CN); Aiguo Peng, Tianjin (CN); Xiaohua Zhang, Tianjin (CN); Shaofeng Kang, Tianjin (CN); Lingsi Xia, Tianjin (CN)

(73) Assignee: TIANJIN EMAGING TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 17/922,966

(22) PCT Filed: Dec. 31, 2021

(86) PCT No.: PCT/CN2021/144058
§ 371 (c)(1),
(2) Date: Nov. 2, 2022

(87) PCT Pub. No.: WO2022/247289
PCT Pub. Date: Dec. 1, 2022

(65) Prior Publication Data
US 2024/0223068 A1     Jul. 4, 2024

(30) Foreign Application Priority Data
May 28, 2021 (CN) .......................... 202110594686.1

(51) Int. Cl.
*H02M 1/00* (2007.01)
*H02M 1/38* (2007.01)
(Continued)

(52) U.S. Cl.
CPC ........... *H02M 1/0038* (2021.05); *H02M 1/38* (2013.01); *H02M 7/53873* (2013.01); *H02M 1/088* (2013.01)

(58) Field of Classification Search
CPC ...... H02M 1/0038; H02M 1/088; H02M 1/38; H02M 7/53873
See application file for complete search history.

(56) References Cited

U.S. PATENT DOCUMENTS

| 4,989,128 A | 1/1991 | Ohyama et al. |
| 10,958,198 B2 | 3/2021 | Erickson et al. |

(Continued)

FOREIGN PATENT DOCUMENTS

| CN | 104158420 A | 11/2014 |
| CN | 105450068 A | 3/2016 |

(Continued)

OTHER PUBLICATIONS

Extended European Search Report for Application No. PCT/CN2021144058, dated Jul. 17, 2023, 8 Pages.

(Continued)

*Primary Examiner* — Jue Zhang
(74) *Attorney, Agent, or Firm* — Brooks Kushman, P.C.

(57) ABSTRACT

A method for suppressing a narrow pulse is provided. The method is applied to a bridge switch circuit having at least one bridge arm which has an upper switch transistor and a lower switch transistor, and includes: detecting whether an original comparison value of a modulated wave in a current cycle is in a preset narrow pulse interval of the upper switch transistor, and if so, determining an adjustment interval of the upper switch transistor to which the original comparison value of the modulated wave currently pertains; and adjusting the original comparison value of the modulated wave to an adjusted comparison value of the modulated wave cor- (Continued)

responding to the adjustment interval of the upper switch transistor to which the original comparison value of the modulated wave currently pertains according to a corresponding relationship between adjustment intervals of the upper switch transistor and adjusted comparison values of the modulated wave.

16 Claims, 6 Drawing Sheets

(51) Int. Cl.
    *H02M 7/5387*        (2007.01)
    *H02M 1/088*         (2006.01)

(56) References Cited

U.S. PATENT DOCUMENTS

| | | | | |
|---|---|---|---|---|
| 2002/0001210 | A1* | 1/2002 | Kuranuki | H02M 3/3376 |
| | | | | 363/98 |
| 2004/0037097 | A1 | 2/2004 | Deng et al. | |
| 2006/0158359 | A1 | 7/2006 | Magrath | |
| 2015/0357915 | A1* | 12/2015 | Kim | H02M 3/1588 |
| | | | | 323/271 |
| 2016/0308524 | A1* | 10/2016 | Inoue | H03K 17/168 |
| 2019/0334457 | A1 | 10/2019 | Jeng et al. | |
| 2020/0091854 | A1* | 3/2020 | Tatewaki | H02P 27/08 |
| 2020/0321890 | A1* | 10/2020 | Li | H02M 1/38 |

FOREIGN PATENT DOCUMENTS

| | | |
|---|---|---|
| CN | 107241029 A | 10/2017 |
| CN | 107508478 A | 12/2017 |
| CN | 109980969 A | 7/2019 |
| CN | 112510978 A | 3/2021 |
| CN | 113037072 A | 6/2021 |
| CN | 111478613 A | 7/2021 |
| IN | 110323927 A | 10/2019 |
| JP | 6196954 B2 | 9/2017 |

OTHER PUBLICATIONS

First Office Action for Chinese Application No. 202110594686.1, dated Jul. 5, 2021, 14 Pages (including English Translation).
Notice of Allowance for Chinese Application No. 202110594686.1, dated Jul. 19, 2021, 8 Pages (including English Translation).
International Search Report and Written Opinion for Application No. PCT/CN2021/144058 dated Mar. 11, 2022, 10 Pages.
Extended European Search Report for Application No. 21923597.5, dated Jul. 17, 2023, 8 Pages.

* cited by examiner

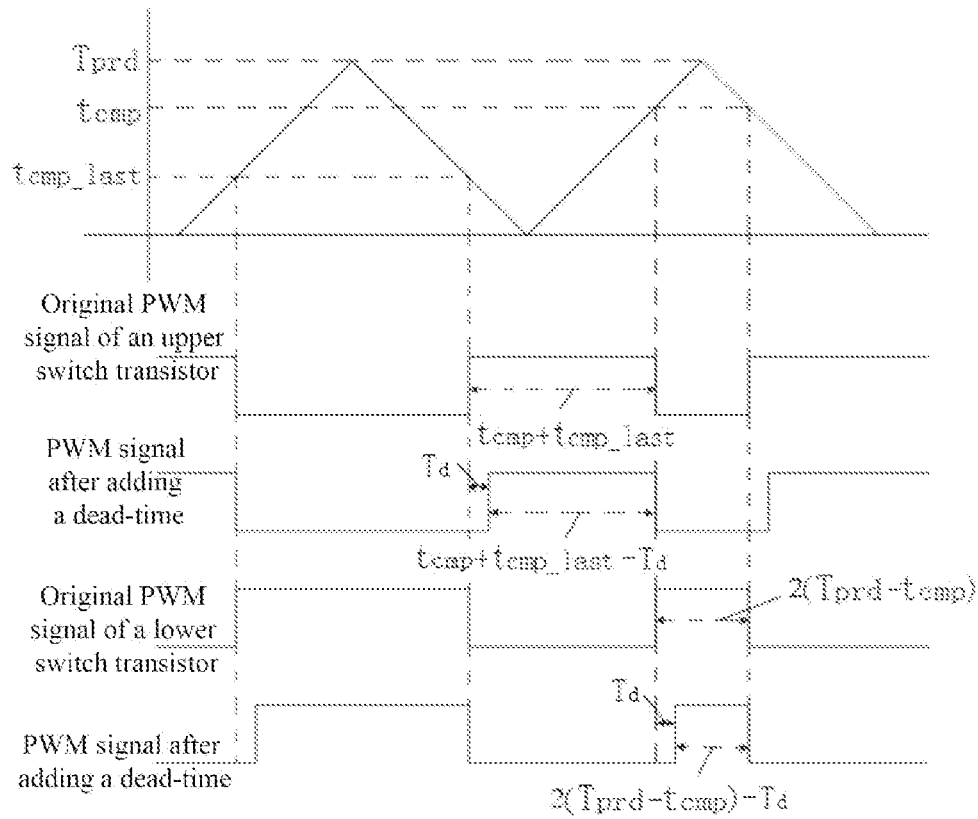

FIG. 1

Detect whether an original comparison value of a modulated wave in a current cycle is within a preset narrow pulse interval of an upper switch transistor; wherein the preset narrow pulse interval of the upper switch transistor includes multiple adjustment intervals of the upper switch transistor obtained by dividing a corresponding value range of the original comparison value of the modulated wave in the current cycle — S110

When it is detected that the original comparison value of the modulated wave in the current cycle is within the preset narrow pulse interval of the upper switch transistor, determine an adjustment interval of the upper switch transistor to which the original comparison value of the modulated wave currently pertains — S120

According to a corresponding relationship between adjustment intervals of the upper switch transistor and adjusted comparison values of the modulated wave, adjust the original comparison value of the modulated wave to an adjusted comparison value of the modulated wave corresponding to the adjustment interval of the upper switch transistor to which the original comparison value of the modulated wave currently pertains — S130

FIG. 2

METHOD AND DEVICE FOR SUPPRESSING NARROW PULSE, AND BRIDGE SWITCHING CIRCUIT

CROSS-REFERENCE TO RELATED APPLICATIONS

This application is the U.S. national phase of PCT Application No. PCT/CN2021/144058 filed on Dec. 31, 2021, which claims priority to Chinese Patent Application No. 202110594686.1 filed on May 28, 2021, which are incorporated herein by reference in their entireties.

TECHNICAL FIELD

Embodiments of the present disclosure relate to, but are not limited to, the technical field of power electronics technology, in particular to a method and a device for suppressing a narrow pulse, and a bridge switching circuit.

BACKGROUND

Bridge switching circuits are widely used in power electronics technology, in which a half-bridge switching circuit is a basic unit for all bridge circuits. For example, taking a typical Insulated Gate Bipolar Transistor (IGBT for short) half-bridge circuit as an example, the circuit consists of upper and lower IGBT switch transistors connected in series. Power switch transistors usually have minimum requirements for durations of on-driving signals and off—driving signals. Too short duration of an on-pulse or an off-pulse (which is referred to as a narrow pulse herein) causes large surge voltage spike and oscillation of switching devices, which threaten reliable operation of the switching devices and even directly damage the switching devices.

In order to prevent the upper and lower switch transistor transistors from being turned on at the same time, turn-on-dead-time is often introduced. For a bridge switching circuit, according to a generation principle of dead-time, although introduction of dead-time does not produce narrow turn-off pulses, narrow turn-on pulses may be produced still. Therefore, to ensure safe operation of devices and reduce electromagnetic interference, it is necessary to limit narrow pulses in a control program.

SUMMARY

Summary of subject matters described in detail herein is given below. The summary is not intended to limit the scope of the claims.

In view of this, embodiments of the present disclosure provide a method and a device for suppressing a narrow pulse, and a bridge switching circuit.

A method for suppressing a narrow pulse is provided in an embodiment of the present disclosure, which it is applied to a bridge switching circuit including at least one bridge arm, each of the bridge arm including an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; the method for suppressing the narrow pulse includes:

detecting whether an original comparison value of the modulated wave in a current cycle is within a preset narrow pulse interval of the upper switch transistor, wherein the preset narrow pulse interval of the upper switch transistor includes multiple adjustment intervals of the upper switch transistor obtained by dividing a corresponding value range of the original comparison value of the modulated wave in the current cycle;

determining an adjustment interval of the upper switch transistor to which the original comparison value of the modulated wave currently pertains when it is detected that the original comparison value of the modulated wave in the current cycle is within the preset narrow pulse interval of the upper switch transistor; and adjusting the original comparison value of the modulated wave to an adjusted comparison value of the modulated wave corresponding to the adjustment interval of the upper switch transistor to which the original comparison value of the modulated wave currently pertains according to a corresponding relationship between the adjustment intervals of the upper switch transistor and adjusted comparison values of the modulated wave.

In some exemplary embodiments, when it is detected that the original comparison value of the modulated wave in the current cycle is not within the preset narrow pulse interval of the upper switch transistor, the method for suppressing the narrow pulse further includes:

calculating current turn-on time of the lower switch transistor according to the original comparison value of the modulated wave in the current cycle and a maximum value of the triangular carrier, and detecting whether the current turn-on time of the lower switch transistor is within a preset narrow pulse interval of the lower switch transistor, wherein the preset narrow pulse interval of the lower switch transistor includes multiple adjustment intervals of the lower switch transistor obtained by dividing a corresponding value range of the turn-on time of the lower switch transistor in the current cycle;

determining an adjustment interval of the lower switch transistor to which the turn-on time of the lower switch transistor currently pertains when it is detected that the current turn-on time of the lower switch transistor is within the preset narrow pulse interval of the lower switch transistor; and adjusting the original comparison value of the modulated wave to an adjusted comparison value of the modulated wave corresponding to the adjustment interval of the lower switch transistor to which the original comparison value of the modulated wave currently pertains according to a corresponding relationship between the adjustment intervals of the lower switch transistor and adjusted comparison values of the modulated wave.

In some exemplary embodiments, the method further includes selecting a corresponding adjusted comparison value of the modulated wave for an adjustment interval of the upper switch transistor, which includes:

selecting a value which is closest to the original comparison value of the modulated wave in the current cycle for the adjustment interval of the upper switch transistor, wherein a sum of the value and a comparison value of the modulated wave in an adjacent cycle is not within an interval $(T_d, T_d+T_{min})$, where $T_d$ is turn-on-dead-time and the $T_{min}$ is a minimum turn-on pulse width of the switch transistor.

In an exemplary embodiment, the preset narrow pulse interval of the upper switch transistor includes a first interval $(1, 0.5\,(T_d+T_{min}))$ and a second interval $(T_d-1, T_d+T_{min})$, where $T_d$ is turn-on-dead-time, $T_{min}$ is a minimum turn-on pulse width of the switch transistor, and $T_d \geq T_{min}+2$; the first interval and the second interval are divided into four adjustment intervals of the upper switch transistor;

determining the adjustment interval of the upper switch transistor to which the original comparison value of the modulated wave currently pertains when it is detected that the original comparison value of the modulated wave in the current cycle is within the preset narrow pulse interval of the upper switch transistor includes:

determining that the original comparison value of the modulated wave is in the preset narrow pulse interval of the upper switch transistor when it is detected that the original comparison value of the modulated wave in the current cycle is in the first interval or the second interval.

In an exemplary embodiment, adjusting the original comparison value of the modulated wave to the adjusted comparison value of the modulated wave corresponding to the adjustment interval of the upper switch transistor to which the original comparison value of the modulated wave currently pertains according to the corresponding relationship between the adjustment intervals of the upper switch transistor and the adjusted comparison values of the modulated wave includes:

when the original comparison value $t_{cmp}$ of the modulated wave meets $1 < t_{cmp} < 0.25 \, (T_d + T_{min})$, adjusting the original comparison value of the modulated wave to be 1;

when the original comparison value $t_{cmp}$ of the modulated wave meets $0.25 \, (T_d + T_{min}) \leq t_{cmp} < 0.5 \, (T_d + T_{min})$, adjusting the original comparison value of the modulated wave to be $0.5 \, (T_d + T_{min})$;

when the original comparison value tcmp of the modulated wave meets $T_d - 1 < t_{cmp} < T_d + 0.5 T_{min}$, adjusting the comparison value of the modulated wave to be $T_d - 1$; and when the original comparison value $t_{cmp}$ of the modulated wave meets $T_d + 0.5 T_{min} \leq t_{cmp} < T_d + T_{min}$, adjusting the original comparison value of the modulated wave to be $T_d + T_{min}$.

In an exemplary embodiment, the preset narrow pulse interval of the upper switch transistor includes a third interval $(0.5(T_d - T_{min}), T_d + T_{min})$, where $T_d$ is turn-on-dead-time, $T_{min}$ is a minimum turn-on pulse width of the switch transistor, and $T_d \geq T_{min} + 2$; the third interval is divided into three adjustment intervals of the upper switch transistor;

determining the adjustment interval of the upper switch transistor to which the original comparison value of the modulated wave currently pertains when it is detected that the original comparison value of the modulated wave in the current cycle is within the preset narrow pulse interval of the upper switch transistor includes:

determining that the original comparison value of the modulated wave is in the preset narrow pulse interval of the upper switch transistor when it is detected that the original comparison value of the modulated wave in the current cycle is in the third interval.

In an exemplary embodiment, adjusting the original comparison value of the modulated wave to the adjusted comparison value of the modulated wave corresponding to the adjustment interval of the upper switch transistor to which the original comparison value of the modulated wave currently pertains according to the corresponding relationship between the adjustment intervals of the upper switch transistor and the adjusted comparison values of the modulated wave includes:

when the original comparison value $t_{cmp}$ of the modulated wave meets $0.5(T_d - T_{min}) < t_{cmp} \leq 0.5 T_d$, adjusting the original comparison value of the modulated wave to be $0.5(T_d - T_{min})$;

when the original comparison value $t_{cmp}$ of the modulated wave meets $0.5 T_d < t_{cmp} \leq 0.75(T_d + T_{min})$, adjusting the original comparison value of the modulated wave to be $0.5(T_d + T_{min})$; and when the original comparison value $t_{cmp}$ of the modulated wave meets $0.75 \, (T_d + T_{min}) \leq t_{cmp} < T_d + T_{min}$, adjusting the original comparison value of the modulated wave to be $T_d + T_{min}$.

In an exemplary embodiment, the preset narrow pulse interval of the upper switch transistor includes a fourth interval $(0.5T_d, T_d + T_{min})$, where $T_d$ is turn-on-dead-time, $T_{min}$ is a minimum turn-on pulse width of the switch transistor, and $T_d \geq T_{min} + 2$; the fourth interval is divided into two adjustment intervals of the upper switch transistor;

determining the adjustment interval of the upper switch transistor to which the original comparison value of the modulated wave currently pertains when it is detected that the original comparison value of the modulated wave in the current cycle is within the preset narrow pulse interval of the upper switch transistor includes:

determining the original comparison value of the modulated wave is in the preset narrow pulse interval of the upper switch transistor when it is detected that the original comparison value of the modulated wave in the current cycle is in the fourth interval.

In an exemplary embodiment, adjusting the original comparison value of the modulated wave to the adjusted comparison value of the modulated wave corresponding to the adjustment interval of the upper switch transistor to which the original comparison value of the modulated wave currently pertains according to the corresponding relationship between the adjustment intervals of the upper switch transistor and the adjusted comparison values of the modulated wave includes:

when the original comparison value $t_{cmp}$ of the modulated wave meets $0.5 T_d < t_{cmp} < 0.75 T_d + 0.5 T_{min}$, adjusting the comparison value of the modulated wave to be $0.5 T_d$; and when the original comparison value $t_{cmp}$ of the modulated wave meets $0.75 T_d + 0.5 T_{min} \leq t_{cmp} < T_d + T_{min}$, adjusting the original comparison value of the modulated wave to be $T_d + T_{min}$.

In an exemplary embodiment, when the original comparison value of the modulated wave in the current cycle is $t_{cmp}$ and a maximum count value of the triangular carrier is $T_{prd}$, then the turn-on time of the lower switch transistor is 2 (Tprd−tcmp), and the preset narrow pulse interval of the lower switch transistor is $(T_d, T_d + T_{min})$, where $T_d$ is the turn-on-dead-time and the $T_{min}$ is a minimum turn-on pulse width of the switch transistor.

In an exemplary embodiment, the preset narrow pulse interval of the lower switch transistor is divided into two adjustment intervals of the lower switch transistor; determining the adjustment interval of the lower switch transistor to which the turn-on time of the lower switch transistor currently pertains when it is detected that current turn-on time of the lower switch transistor is within the preset narrow pulse interval of the lower switch transistor includes:

determining that the turn-on time of the lower switch transistor is within the preset narrow pulse interval of the lower switch transistor when it is detected that the turn-on time of the lower switch transistor in the current cycle is within an interval (Td, Td+Tmin).

In an exemplary embodiment, adjusting the original comparison value of the modulated wave to the adjusted comparison value of the modulated wave corresponding to the adjustment interval of the lower switch transistor to which the original comparison value of the modulated wave currently pertains according to the corresponding relationship between the adjustment intervals of the lower switch transistor and the adjusted comparison values of the modulated wave includes:

when the current turn-on time of the lower switch transistor meets $T_d<2\ (T_{prd}-t_{cmp})\leq T_d+0.5T_{min}$, adjusting the original comparison value of the modulated wave to be $T_{prd}-0.5T_d$; and when the current turn-on time of the lower switch transistor meets $T_d+0.5T_{min}<2(T_{prd}-t_{cmp})<T_d+T_{min}$, adjusting the original comparison value of the modulated wave to be $T_{prd}-0.5\ (T_d+T_{min})$.

An device for suppressing a narrow pulse is also provided in an embodiment of the present disclosure, which it is applied to a bridge switching circuit including at least one bridge arm, each of the bridge arm including an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; the device for suppressing a narrow pulse includes:

a detection module, which is configured to detect whether an original comparison value of a modulated wave in a current cycle is within a preset narrow pulse interval of the upper switch transistor, wherein the preset narrow pulse interval of the upper switch transistor includes multiple adjustment intervals of the upper switch transistor obtained by dividing a corresponding value range of the original comparison value of the modulated wave in the current cycle;

a determination module, which is configured to determine an adjustment interval of the upper switch transistor to which the original comparison value of the modulated wave currently pertains when it is detected that the original comparison value of the modulated wave in the current cycle is within the preset narrow pulse interval of the upper switch transistor; and an adjustment module, which is configured to adjust the original comparison value of the modulated wave to an adjusted comparison value of the modulated wave corresponding to the adjustment interval of the upper switch transistor to which the original comparison value of the modulated wave currently pertains according to a corresponding relationship between the adjustment intervals of the upper switch transistor and adjusted comparison values of the modulated wave.

A device for suppressing a narrow pulse is further provided in an embodiment of the present disclosure, which is applied to a bridge switching circuit including at least one bridge arm, each of the bridge arm including an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; the device includes a processor and a memory storing a computer program that is capable of being run on the processor, wherein the processor implements steps in the above-mentioned method for suppressing a narrow pulse when executing the program.

A non-transitory computer storage medium is further provided in an embodiment of the present disclosure, which stores program instructions, and when the program instructions are executed, the method for suppressing a narrow pulse can be implemented.

A bridge switching circuit is further provided in an embodiment of the present disclosure, which includes at least one bridge arm, each of the at least one bridge arm including an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; wherein each of the at least one bridge arm performs narrow pulse suppression using the above-mentioned method.

In some exemplary embodiments, the bridge switching circuit includes, but is not limited to, a half-bridge switching circuit, a full-bridge switching circuit, a three-phase bridge switching circuit, a six-phase bridge switching circuit, or a nine-phase bridge switching circuit.

Other aspects may be understood upon reading and understanding of the drawings and detailed description.

BRIEF DESCRIPTION OF DRAWINGS

In order to more clearly explain technical solutions of embodiments of the present disclosure, drawings required to be used in the embodiments will be briefly described below. It should be understood that the following drawings illustrate only certain embodiments of the present disclosure and therefore should not be construed as limitations on the scope, and other relevant drawings may be obtained from these drawings without creative effort by those of ordinary skills in the art.

FIG. 1 shows a schematic diagram of a generation principle of PWM driving pulses of upper and lower switch transistors of a half-bridge switching circuit.

FIG. 2 shows a first schematic flowchart of a method for suppressing a narrow pulse according to an embodiment of the present disclosure.

DETAILED DESCRIPTION

Figure 3:
FIG. 3 shows a second schematic flowchart of a method for suppressing a narrow pulse according to an embodiment of the present disclosure.

Technical solutions in embodiments of the present disclosure will be clearly and completely described below with reference to the drawings of the embodiments of the present disclosure. The described embodiments are only a part of the embodiments of the present disclosure, but not all of the embodiments of the present disclosure.

Typically, components in the embodiments of the present disclosure described and illustrated in the drawings herein may be arranged and designed in a variety of different configurations. Accordingly, the following detailed description of the embodiments of the present disclosure provided in the drawings is not intended to limit the scope of the present disclosure as claimed, but is merely representative of selected embodiments of the present disclosure. Based on the embodiments of the present disclosure, all other embodiments obtained without creative effort by those skilled in the art fall within the protection scope of the present disclosure.

In the following, terms "comprise", "have" and their cognates, which may be used in the embodiments of the present disclosure, are intended only to denote particular features, numbers, steps, operations, elements, components, or combinations of the foregoing, and should not be construed as at first excluding a presence of or increasing the possibility of one or more other features, numbers, steps, operations, elements, components, or combinations of the foregoing.

Furthermore, terms "first", "second", "third", etc. are used only to distinguish descriptions and cannot be understood as indicating or implying relative importance.

All terms used herein (including technical and scientific terms) have the same meanings as those usually understood by those of ordinary skills in the art to which the various embodiments of the present disclosure pertain unless otherwise defined. The terms, such as those defined in commonly used dictionaries, will be construed as having a same meaning as contextual meanings in the related art and will not be construed as having idealized or overly formal meanings unless explicitly defined in the embodiments of the present disclosure.

In a digitally controlled bridge switching circuit, Pulse Width Modulation (PWM) driving pulses of upper and lower switch transistors in the bridge switching circuit can be generated by comparing a count value of a triangular carrier (or a sawtooth wave) with a comparison value of a modulated wave. As shown in FIG. 1, taking an example in which a high level of a PWM signal represents turning on a switch transistor, when a modulated wave is greater than a triangular carrier, an upper switch transistor is turned on, a PWM signal of the upper switch transistor is set high, a lower switch transistor is turned off, and a PWM signal of the lower switch transistor is set low. When the modulated wave is smaller than the triangular carrier, the upper switch transistor is turned off, the PWM signal of the upper switch transistor is set low, the lower switch transistor is turned on, and the PWM signal of the lower switch transistor is set high.

In a practical application, in order to prevent the upper and lower switch transistors from being turned on at the same time, turn-on-dead-time is usually introduced, and a final PWM driving signal of each of the upper and lower switch transistors is obtained by delaying a rising edge of the PWM signal by one dead-time length. In order to ensure the safety of devices, the dead-time set for the PWM signal is usually larger than a minimum turn-on pulse width of the switch transistor. However, for bridge circuits, although introduction of the dead-time does not produce narrow off-pulses, narrow turn-on pulses may be produced.

With reference to FIG. 1, if a maximum count value of the triangular carrier is set to $T_{prd}$, the turn-on-dead-time is set to $T_d$, and the minimum turn-on pulse width of the switch transistor is $T_{min}$, a comparison value of a modulated wave in a previous cycle is recorded as $t_{cmp\_last}$, and an original comparison value of the modulated wave in a current cycle is recorded as $t_{cmp}$, it can be seen from FIG. 1 that turn-on time of an upper switch transistor can be denoted by $t_{cmp}\_last+t_{cmp}$, and turn-on time of a lower switch transistor is $2(T_{prd}-t_{cmp})$ in one cycle. It should be understood that the upper and lower switch transistors do not generate narrow pulses at the same time in one cycle.

Based on analysis, it can be seen that for the upper switch transistor:
(1) when $t_{cmp\_last}+t_{cmp}=0$, there is no turn-on pulse in the upper switch transistor;
(2) when $0<t_{cmp\_last}+t_{cmp}\leq T_d$, there is a turn-on pulse in an original PWM signal of the upper switch transistor, but a turn-on pulse width after adding the dead-time $T_d$ is 0, that is, there is no turn-on pulse;
(3) when $T_d<t_{cmp\_last+tcmp}<T_d+T_{min}$, the upper switch transistor generates a turn-on pulse whose width is less than $T_{min}$ after the dead-time $T_d$ is added, that is, a narrow turn-on pulse may be generated; and
(4) when $t_{cmp\_last}+t_{cmp}\geq T_d+T_{min}$, the upper switch transistor generates a turn-on pulse whose width is greater than the $T_{min}$ after the dead-time $T_d$ is added, that is, there is a turn-on pulse, but the pulse is not a narrow pulse.

Similarly, for the lower switch transistor:
(1) when $2(T_{prd}-t_{cmp})=0$, there is no turn-on pulse in the lower switch transistor;
(2) when $0<2(T_{prd}-t_{cmp})\leq T_d$, there is a turn-on pulse in an original PWM signal of the lower switch transistor, but a turn-on pulse width after adding the dead-time $T_d$ is 0, that is, there is no turn-on pulse;
(3) when $T_d<2(T_{prd}-t_{cmp})<T_d+T_{min}$, the lower switch transistor generates a turn-on pulse whose width is less than the $T_{min}$ after the dead-time $T_d$ is added, that is, a narrow turn-on pulse may be generated; and
(4) when $2(T_{prd}-t_{cmp})\geq T_d+T_{min}$, the lower switch transistor generates a turn-on pulse whose width is greater than the $T_{min}$ after the dead-time $T_d$ is added, that is, there is a turn-on pulse, but the pulse is not a narrow pulse.

To ensure safe operation of devices and reduce electromagnetic interference, it is necessary to restrict possible narrow pulses in a control program.

In a practical application, a controlling method for narrow pulse includes: performing amplitude limit on a modulated wave, so that a turn-on pulse of each of the upper and lower switch transistors generated after the dead-time is added is greater than a minimum allowable turn-on pulse width $T_{min}$. This method is relatively simple, but it will affect a maximum output voltage because of limited amplitude of a comparison value of the modulated wave which reduces a modulation degree. In a high-speed frequency converter and other high-carrier occasions, as each control cycle is short, an influence of the limited amplitude is particularly prominent.

In another adjustment method, when it is judged that narrow pulses may be generated, the comparison value of the modulated wave is directly modified to a closest value that does not generate narrow pulses. In this method, a comparison value of a modulated wave in a previous cycle is used in an avoid algorithm of a narrow pulse of an upper switch transistor. When a comparison value in a current cycle is 0, there may also be a narrow turn-on pulse in the upper switch transistor under the influence of the comparison value in the previous cycle, and the comparison value modified according to the above-mentioned method will become a positive value, in other words, the zero comparison value will be modified to a non-zero comparison value.

It can be seen that the Discontinuous Pulse Width Modulation (DPWM) technology usually has a comparison value of 0 in multiple consecutive cycles, that is, a switching process of a certain phase does not occur. If the above-mentioned adjustment method is employed, a condition without switching may be destroyed, which affects the application of the DPWM technology. Alternatively, in a three-level application, adjusting a comparison value from 0 to a non-zero comparison value means adjusting switch transistors which are turned off in all in a current control cycle to not turned off in all, which may cause a bridge arm to short, and then leads to malfunction.

For this reason, a method for suppressing a narrow pulse is provided in an embodiment of the present disclosure, which can avoid occurrence of narrow pulses by adjusting a comparison value of a modulated wave correspondingly. Furthermore, amplitude of a modulated wave is not limited, that is, a maximum output voltage is not affected, and the method can be applied to scenarios such as the DPWM, the three-level technology, etc. The method for suppressing a narrow pulse will be described in detail below in connection with exemplary embodiments.

Referring to FIG. 2, this embodiment provides a method for suppressing a narrow pulse, which can be applied to various scenarios of bridge switching circuits. The method can effectively suppress the generation of narrow pulses, and can also solve some shortcomings in other solutions, thus having good practicability. In this embodiment, a bridge switching circuit may include at least one bridge arm, wherein each bridge arm consists of an upper switch transistor and a lower switch transistor connected in series. For example, the bridge switching circuit may be a half-bridge circuit with a single bridge arm, a full-bridge circuit with double bridge arms, or a three-phase bridge circuit with three bridge arms, etc.

Typically, before narrow pulse suppression control is performed, it is necessary to determine whether there is a narrow pulse generated by a switch transistor in a current cycle, and which switch has a possibility of generating a narrow pulse. In some technologies, as shown in FIG. 1, for the upper switch transistor, it is usually determined whether the upper switch transistor may generate a narrow pulse in the current cycle according to a sum of a comparison value of a modulated wave in a previous cycle and an original comparison value of the modulated wave in the current cycle (i.e., $t_{cmp\_last} + t_{cmp}$).

However, in this embodiment, according to the original comparison value of the modulated wave in the current cycle, it is judged whether the upper switch transistor may generate a narrow pulse in the current cycle or in a next cycle. When it is possible to generate a narrow pulse in the current cycle or the next cycle, the original comparison value of the modulated wave in the current cycle is adjusted. For example, when for the sum of the original comparison value of the modulated wave in the current cycle and the comparison value of the modulated wave in the previous cycle, $T_d < t_{cmp\_last} + t_{cmp} < T_d + T_{min}$ does not exist, but it is predicted that a narrow pulse may exist in a sum of the original comparison value of the modulated wave in the current cycle and the original comparison value of the modulated wave in the next cycle, the original comparison value of the modulated wave in the current cycle should still be adjusted to ensure that the sum of the original comparison value of the modulated wave in the current cycle and the comparison value of the modulated wave in any adjacent cycle does not generate a narrow pulse.

As shown in FIG. 2, a method for suppressing a narrow pulse will be described below. In an exemplary embodiment, the method for suppressing a narrow pulse may include following steps S110 to S130.

In the step S110, whether an original comparison value of a modulated wave in a current cycle is within a preset narrow pulse interval of an upper switch transistor is detected. Herein, the preset narrow pulse interval of the upper switch transistor includes multiple adjustment intervals of the upper switch transistor obtained by dividing a corresponding value range of the original comparison value of the modulated wave in the current cycle, that is, a range of all possible values of the original comparison value of the modulated wave in the current cycle are divided into multiple adjustment intervals of the upper switch transistor, which constitute the preset narrow pulse interval of the upper switch transistor.

In the step S120, when it is detected that the original comparison value of the modulated wave in the current cycle is within the preset narrow pulse interval of the upper switch transistor, an adjustment interval of the upper switch transistor to which the original comparison value of the modulated wave currently pertains is determined.

In this embodiment, the preset narrow pulse interval of the upper switch transistor is composed of a range of all possible values of the original comparison value of the modulated wave (i.e., the original comparison value of the modulated wave) in the current cycle in case that the upper switch transistor may generate a narrow pulse in the current cycle or the next cycle. Furthermore, by dividing into the range of the possible values of the original comparison value of the modulated wave in the current cycle, multiple adjustment intervals of the upper switch transistor can be obtained. The terms "multiple" and "a plurality of" as described herein include a case of two or more intervals.

It can be understood that the original comparison value of the modulated wave in each cycle is unique, and adjustment rules for the original comparison value of the modulated wave are different when different switch transistors may produce narrow pulses. Therefore, in this specification, adjustment intervals of the upper switch transistor and adjustment intervals of the lower switch transistor are used for distinguishing the division of adjustment intervals for upper switch transistor and the lower switch transistor.

By way of example, after the original comparison value of the modulated wave in the current cycle is known, whether the original comparison value of the modulated wave in the current cycle is within the preset narrow pulse interval of the upper switch transistor can be detected, wherein when it is detected that the original comparison value of the modulated wave is within the preset narrow pulse interval, it can be determined that the upper switch transistor possibly generates a narrow pulse in the current cycle or an adjacent cycle. At this time, it is necessary to adjust the original comparison value of the modulated wave in the current cycle, and the step S130 can be performed to avoid the occurrence of the narrow pulse.

In the step S130, according to a corresponding relationship between adjustment intervals of the upper switch transistor and adjusted comparison values of the modulated wave, the original comparison value of the modulated wave is adjusted to an adjusted comparison value of the modulated wave corresponding to the adjustment interval of the upper switch transistor to which the original comparison value of the modulated wave currently pertains.

In this embodiment, by presetting the corresponding relationship between each adjustment interval of the upper switch transistor and a corresponding adjusted value of the comparison value of the modulated wave (referred to as an adjusted comparison value of the modulated wave for short), that is, each adjustment interval of the upper switch transistor corresponds to one adjusted comparison value of the modulated wave, so as to determine the corresponding adjusted comparison value of the modulated wave after the adjustment interval of the upper switch transistor to which the original comparison value of the modulated wave in the current cycle pertains is determined.

The method for suppressing a narrow pulse in the embodiment of the present disclosure determines whether the upper switch transistor possibly generates a narrow pulse in the current cycle or the next cycle by using the original comparison value of the modulated wave in the current cycle, and independently adjusts the original comparison value of the modulated wave in the current cycle when the narrow pulse may be generated, without adjusting the original comparison value of the modulated wave in the current cycle in combination with the comparison value of the modulated wave in the previous cycle. Therefore, in a case of avoiding the occurrence of the narrow pulse, the problem of reducing the modulation degree due to limited amplitude of the modulated wave in some solutions which affects the maximum output voltage, can be avoided, and the method can be applied to scenarios such as the DPWM and the three-level technology, thus greatly increasing application scenarios of the bridge switches.

In an embodiment, the method further includes the following steps: the adjusted comparison value of the modulated wave corresponding to the adjustment interval of the upper switch transistor is selected, and a corresponding relationship between the adjustment interval of the upper switch transistor and the selected adjusted comparison value of the modulated wave is formed after selection. In a process of selecting the adjusted comparison value of the modulated wave corresponding to each adjustment interval of the upper switch transistor, according to a corresponding adjustment interval of the upper switch transistor, a value which is closest to the original comparison value of the modulated wave in the current cycle and does not generate a narrow pulse can be selected. The so-called "does not generate the narrow pulse" means that a sum of the value and the comparison value of the modulated wave in an adjacent cycle is not within the interval ($T_d$, $T_d+T_{min}$). For example, the value can be a boundary value of the adjustment interval of the upper switch transistor or a certain value in the interval.

The corresponding value range of the original comparison value of the modulated wave in the current cycle can be divided into multiple adjustment intervals of the upper switch transistor, such as two, three or four adjustment intervals of the upper switch transistor, etc. It can be understood that a division rule can be selected according to actual demands, which are not limited herein. Typically, the more intervals are divided, the less influence on output voltage characteristics caused by the adjustment will be, that is, there will be no large voltage jump.

It can be understood that, in the method, generation of the narrow pulse is not judged by turn-on time of the upper switch transistor, but only according to the comparison value of the modulated wave in the current cycle, Besides effectively preventing the occurrence of the narrow pulse, since only the magnitude of the original comparison value in the modulated wave in the current cycle is considered and is adjusted independently in the current cycle, the zero value is not adjusted to the non-zero value in any cycle, and the method can be applied to scenarios such as the three-level technology or the DPWM.

Typically, in a switching cycle, when it is judged that the upper switch transistor may generate a narrow pulse, it is unnecessary to judge the lower switch transistor. Otherwise, when it is detected that the original comparison value of the modulated wave in the current cycle is not within the preset narrow pulse interval of the upper switch transistor, that is, it is judged that the upper switch transistor does not generate a narrow pulse, then the lower switch transistor is to be judged.

In an exemplary embodiment, as shown in FIG. 3, the method for suppressing a narrow pulse may further include the following steps S140 to S160.

In the step S140, according to the original comparison value of the modulated wave in the current cycle and a maximum value of a triangular carrier, turn-on time of a lower switch transistor in the current cycle is calculated, and whether the turn-on time of the lower switch transistor in the current cycle is within a preset narrow pulse interval of the lower switch transistor is detected.

In an exemplary embodiment, for the lower switch transistor, the turn-on time of the lower switch transistor may be calculated based on the original comparison value of the modulated wave in the current cycle and the maximum value of the triangular carrier, i.e. whether a narrow pulse may be generated in the current cycle is determined based on the 2 ($T_{prd}-t_{cmp}$). Based on the above analysis of the lower switch transistor, it can be seen that the preset narrow pulse interval of the lower switch transistor is $T_d<2$ ($T_{prd}-t_{cmp})<T_d+T_{min}$ when judging by the turn-on time. Furthermore, the preset narrow pulse interval of the lower switch transistor is divided into multiple adjustment intervals of the lower switch transistor, and a value is selected in advance for each adjustment interval of the lower switch transistor as an adjusted comparison value of the modulated wave. For example, a value which is closest to the adjustment interval of the lower switch transistor and does not generate a narrow pulse can be selected.

For the preset narrow pulse interval of the upper switch transistor in this embodiment, the original comparison value of the modulated wave in the current cycle is taken as a judgment object, and for the lower switch transistor, the turn-on time of the lower switch transistor is directly taken as a judgment object for narrow pulse generation. Therefore, for the lower switch transistor, the adjustment interval is determined directly according to the turn-on time of the lower switch transistor, and then the adjusted comparison value of the modulated wave is determined.

In the step S150, when it is detected that current turn-on time of the lower switch transistor is within the preset narrow pulse interval of the lower switch transistor, an adjustment interval of the lower switch transistor to which the turn-on time of the lower switch transistor currently pertains is determined.

In the step S160, according to a corresponding relationship between adjustment intervals of the lower switch transistor and adjusted comparison values of the modulated wave, the original comparison value of the modulated wave is adjusted to an adjusted comparison value of the modulated wave corresponding to the adjustment interval of the lower switch transistor to which the original comparison value of the modulated wave currently pertains.

In an exemplary embodiment, when it is detected that the current turn-on time of the lower switch transistor is within the preset narrow pulse interval of the lower switch transistor, an adjustment interval of the lower switch transistor to which the turn-on time currently pertains is determined, and then the adjusted comparison value of the modulated wave is determined. Finally, the original comparison value of the modulated wave in the current cycle is adjusted to a determined adjusted comparison value of the modulated wave.

In the above method for suppressing narrow pulse, the lower switch transistor may be judged at first, and then the steps of judging for the upper switch transistor are performed if the lower switch transistor does not generate a narrow pulse. A sequence of determination steps for narrow pulse generation of the upper switch transistor or the lower switch transistor is not limited in the embodiment.

Alternatively, when it is judged that neither the upper switch transistor nor the lower switch transistor generates a narrow pulse in the current cycle, that is, there is no possibility of generating a narrow pulse, the original comparison value of the modulated wave in the current cycle is not adjusted.

The method for suppressing narrow pulse in the embodiment of the present disclosure, a preset narrow pulse interval of the upper switch transistor only related to the original comparison value of the modulated wave in the current cycle is determined as the basis for whether the upper switch transistor has a possibility of generating a narrow pulse. The occurrence of narrow pulses can be effectively prevented by independently adjusting the original comparison value of the modulated wave in the current cycle in the preset narrow pulse interval of the upper switch transistor, without adjusting the original comparison value of the modulated wave in the current cycle in combination with the comparison value of the modulated wave in the previous cycle, that is, the original comparison value of the modulated wave in the current cycle is not determined and adjusted directly according to the turn-on time of the upper switch transistor. Furthermore, for scenarios such as three-level or DPWM, adjusting a zero value to a non-zero value will not occur, which enlarges an application range of this method. In addition, because amplitude limiting is not used in this method, the maximum output voltage is not affected in high carrier scenarios such as high-speed frequency converter.

Figure 4:
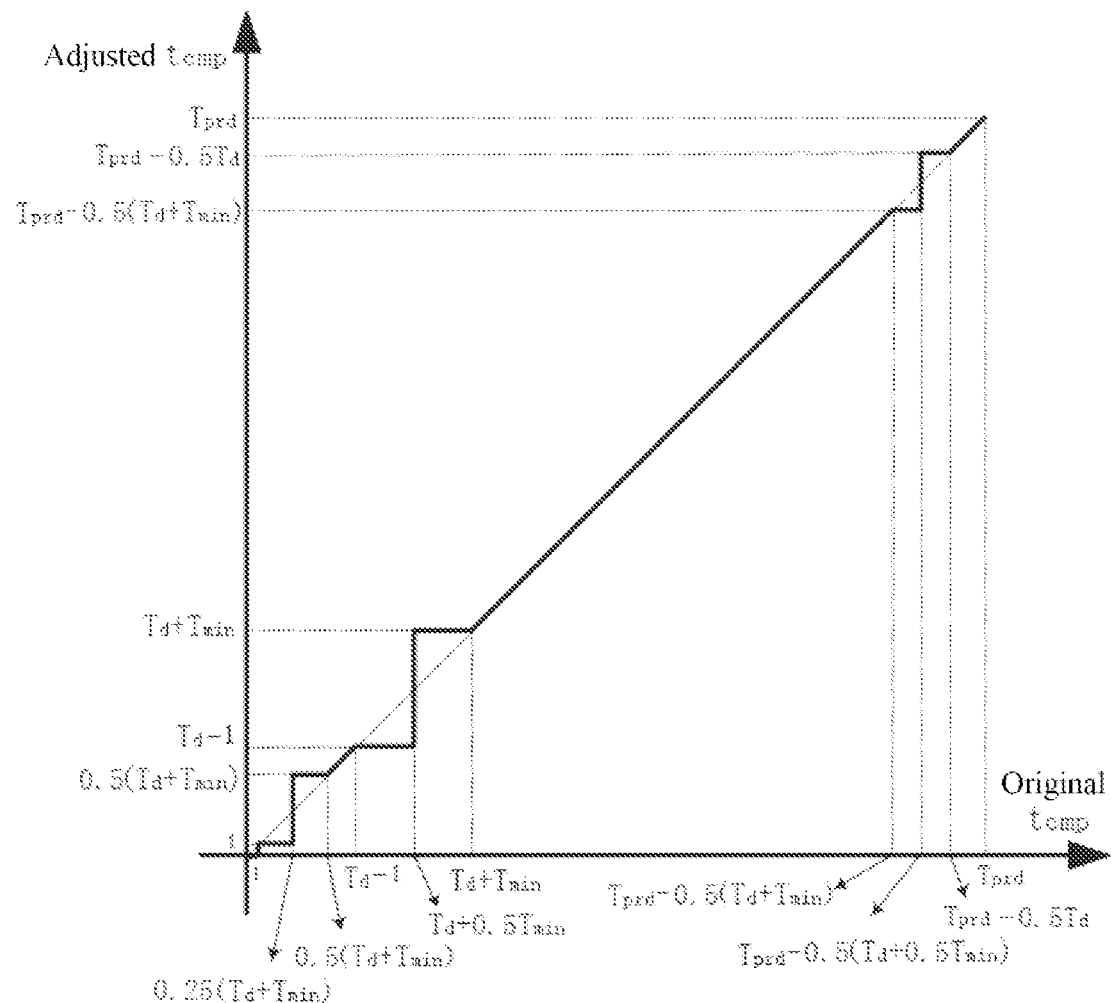
FIG. 4 shows a comparative schematic diagram of a method for suppressing a narrow pulse based on an upper switch transistor in a first adjustment mode according to an embodiment of the present disclosure.

Referring to FIG. 4, based on the method for suppressing a narrow pulse in the above-mentioned embodiment, an exemplary division of a preset narrow pulse interval of an upper switch transistor will be described below. Since the introduced turn-on-dead-time $T_d$ of the switch transistor is usually greater than a minimum turn-on pulse width $T_{min}$, considering that a counting frequency of the triangular carrier is often as high as tens of MHz in practice, time corresponding to two counting values is very small at this time, so it may be set that $T_d \geq T_{min}+2$, which means $0.5(T_d+T_{min}) \leq T_d-1$.

In an exemplary embodiment, the preset narrow pulse interval of the upper switch transistor includes a first interval $(1, 0.5(T_d+T_{min}))$ and a second interval $(T_d-1, T_d+T_{min})$. The two intervals can be divided into, for example, four adjustment intervals of the upper switch transistor, which are respectively: $1<t_{cmp}<0.25(T_d+T_{min})$, $0.25(T_d+T_{min}) \leq t_{cmp}<0.5(T_d+T_{min})$, $T_d-1<t_{cmp}<T_d+0.5T_{min}$ and $T_d+0.5T_{min} \leq t_{cmp}<T_d+T_{min}$. It can be understood that division of a number of the adjustment intervals of the upper switch transistor and a range of the adjustment interval of the upper switch transistor can be selected according to actual demands.

In the above step S110, when it is detected that the original comparison value of the modulated wave in the current cycle is in the first interval or the second interval, it is determined that the original comparison value of the modulated wave is in the preset narrow pulse interval of the upper switch transistor, and at this time, the original comparison value of the modulated wave in the current cycle is adjusted to avoid the occurrence of narrow pulse in the upper switch transistor.

Therefore, in the above steps S120-S130,
(a) when the original comparison value $t_{cmp}$ of the modulated wave meets $1<t_{cmp}<0.25(T_d+T_{min})$, the modulated wave adjusted comparison value is 1 at this time, so that the original comparison value of the modulated wave in the current cycle can be adjusted to 1;
(b) when the original comparison value $t_{cmp}$ of the modulated wave meets $0.25(T_d+T_{min}) \leq t_{cmp}<0.5(T_d+T_{min})$, the adjusted comparison value of the modulated wave is $0.5(T_d+T_{min})$ at this time;
(c) when the original comparison value $t_{cmp}$ of the modulated wave meets $T_d-1<t_{cmp}<T_d+0.5T_{min}$, the adjusted comparison value of the modulated wave is $T_d-1$ at this time; and
(d) when the original comparison value $t_{cmp}$ of the modulated wave meets $T_d+0.5T_{min} \leq t_{cmp}<T_d+T_{min}$, the adjusted comparison value of the modulated wave is $T_d+T_{min}$ at this time;

FIG. 4 shows a schematic diagram of a comparison before and after adjustment on a comparison value of a modulated wave in a current cycle in case that a narrow pulse may be present in an upper switch transistor or a lower switch transistor. As shown in FIG. 4, for the upper switch transistor, there are only three cases for an adjusted original comparison value of the modulated wave, that is, 0-1, $0.5(T_d+T_{min})$-$(T_d-1)$ and $\geq T_d+T_{min}$. Furthermore, it can be verified whether the adjusted comparison value of the modulated wave still generate a narrow pulse. When a comparison value $t_{cmp\_last}$ of the modulated wave in a previous cycle and original comparison value $t_{cmp}$ of the modulated wave in the current cycle have different values, corresponding turn-on pulses of the upper switch transistor are shown in Table 1 below.

TABLE 1

| $t_{cmp\_last}$ | $t_{cmp}$ | $t_{cmp\_last} + t_{cmp}$ | Turn-on pulse of upper switch transistor after dead time is introduced |
|---|---|---|---|
| 0~1 | 0~1 | ≤2 | 0 |
| 0~1 | $0.5(T_d+T_{min})$~$(T_d-1)$ | ≤$T_d$ | 0 |
| 0~1 | ≥$T_d+T_{min}$ | ≥$T_d+T_{min}$ | ≥$T_{min}$ |
| $0.5(T_d+T_{min})$~$(T_d-1)$ | 0~1 | ≤$T_d$ | 0 |
| $0.5(T_d+T_{min})$~$(T_d-1)$ | $0.5(T_d+T_{min})$~$(T_d-1)$ | ≥$T_d+T_{min}$ | ≥$T_{min}$ |

TABLE 1-continued

| $t_{cmp\_last}$ | $t_{cmp}$ | $t_{cmp\_last} + t_{cmp}$ | Turn-on pulse of upper switch transistor after dead time is introduced |
|---|---|---|---|
| $0.5(T_d + T_{min})$~$(T_d - 1)$ | $\geq T_d + T_{min}$ | $\geq T_d + T_{min}$ | $\geq T_{min}$ |
| $\geq T_d + T_{min}$ | 0~1 | $\geq T_d + T_{min}$ | $\geq T_{min}$ |
| $\geq T_d + T_{min}$ | $0.5(T_d + T_{min})$~$(T_d - 1)$ | $\geq T_d + T_{min}$ | $\geq T_{min}$ |
| $\geq T_d + T_{min}$ | $\geq T_d + T_{min}$ | $\geq T_d + T_{min}$ | $\geq T_{min}$ |

It can be verified that $T_d < t_{cmp\_last} + t_{cmp} < T_d + T_{min}$ will not occur (that is, the upper switch transistor will not have a narrow turn-on pulse), regardless of which of the three cases of the comparison value of the modulated wave in the previous cycle and the original comparison value of the modulated wave in the current cycle.

In an exemplary embodiment, when it is determined that the upper switch transistor does not have a possibility of generating a narrow pulse, a possibility of generating a narrow pulse by the lower switch transistor may be determined. A preset narrow pulse interval of the lower switch transistor will be explained in the embodiment by dividing the preset narrow pulse interval into two adjustment intervals of the lower switch transistor. Of course the preset narrow pulse interval may be divided into more adjustment intervals in other embodiments, which is not limited herein. In an embodiment, the preset narrow pulse interval of the lower switch transistor is divided into two adjustment intervals of the lower switch transistor, such as, $T_d < 2(T_{prd} - t_{cmp}) \leq T_d + 0.5T_{min}$ and $T_d + 0.5T_{min} < 2(T_{prd} - t_{cmp}) < T_d + T_{min}$.

In the step S140, when it is detected that the current turn-on time $2(T_{prd} - t_{cmp})$ of the lower switch transistor is in an interval $(T_d, T_d + T_{min})$, it is determined that the turn-on time of the lower switch transistor is within the preset narrow pulse interval of the lower switch transistor. At this time, the original comparison value of the modulated wave in the current cycle is adjusted to avoid the occurrence of narrow pulse in the lower switch transistor.

Therefore, in the above steps S150-S160,
(a) when the current turn-on time of the lower switch transistor in the cycle meets $T_d < 2(T_{prd} - t_{cmp}) \leq T_d + 0.5T_{min}$, the turn-on time of the lower switch transistor can be adjusted to $2(T_{prd} - t_{cmp}) = T_d$, that is, the adjusted comparison value of the modulated wave is $T_{prd} - 0.5T_d$; and
(b) when the current turn-on time of the lower switch transistor in the cycle meets $T_d + 0.5T_{min} < 2(T_{prd} - t_{cmp}) < T_d + T_{min}$, the turn-on time of the lower switch transistor can be adjusted to $2(T_{prd} - t_{cmp}) = T_d + T_{min}$, that is, the adjusted comparison value of the modulated wave is $Tprd - 0.5(T_d + T_{min})$.

FIG. 4 further shows a schematic diagram of a comparison before and after adjustment on the original comparison value of the modulated wave in case that a narrow pulse may be generated in the lower switch transistor. It can be verified that $T_d < 2(T_{prd} - t_{cmp}) < T_d + T_{min}$ (that is, the lower switch transistor will not have a narrow turn-on pulse) will not occur, regardless of which of the three cases of the original comparison value $t_{cmp}$ of the modulated wave in the current cycle.

Figure 5:
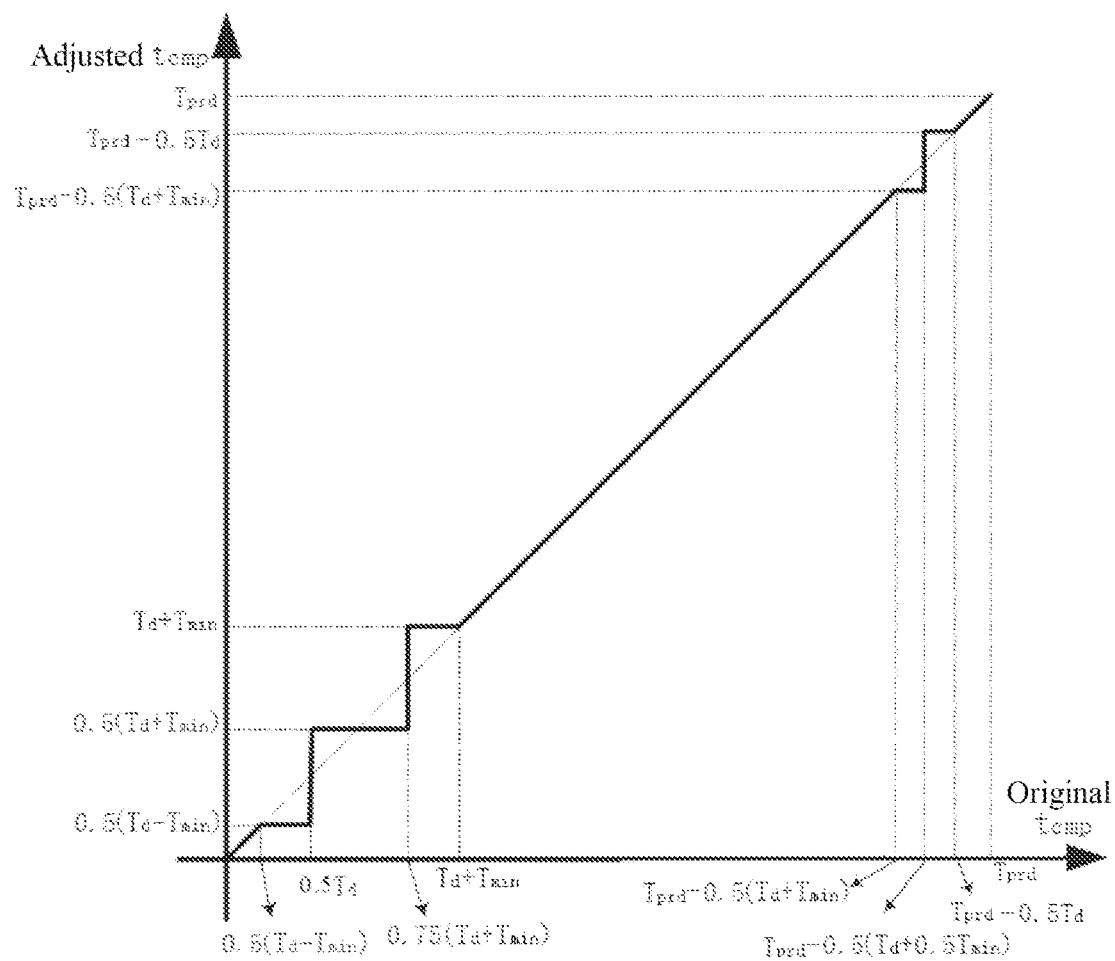
FIG. 5 shows a comparative schematic diagram of a method for suppressing a narrow pulse based on an upper switch transistor in a second adjustment mode according to an embodiment of the present disclosure.

Referring to FIG. 5, based on the method in the above-mentioned embodiment, another exemplary division of a preset narrow pulse interval of an upper switch transistor will be described below. For example, the preset narrow pulse interval of the upper switch transistor includes an interval $(0.5(T_d - T_{min}), T_d + T_{min})$, which is denoted by a third interval here. It should be understood that the term "third" of the third interval here is only for the convenience of distinguishing division intervals described in different embodiments, which are independent of the term "first" of the first interval and the term "second" of the second interval described above.

The third interval can be divided, for example, into three adjustment intervals of the upper switch transistor, which are respectively $0.5(T_d - T_{min}) < t_{cmp} \leq 0.5T_d$, $0.5 T_d < t_{cmp} \leq 0.75(T_d + T_{min})$ and $0.75(T_d + T_{min}) < t_{cmp} < T_d + T_{min}$. Of course, in other embodiments, the third interval may be divided into other number of adjustment intervals of the upper switch transistor or into other range of adjustment intervals of the upper switch transistor, which are not limited herein.

In the above step S110, when it is detected that the original comparison value $t_{cmp}$ of the modulated wave in the current cycle is in the third interval, it may be determined that the original comparison value of the modulated wave in the current cycle is in the preset narrow pulse interval of the upper switch transistor, and at this time, the original comparison value of the modulated wave in the current cycle is adjusted to avoid the occurrence of narrow pulse in the upper switch transistor.

Therefore, in the above steps S120-S130,
(a) when the original comparison value $t_{cmp}$ of the modulated wave meets $0.5(T_d - T_{min}) < t_{cmp} \leq 0.5T_d$, the adjusted comparison value of the modulated wave is $0.5(T_d - T_{min})$ at this time;
(b) when the original comparison value $t_{cmp}$ of the modulated wave meets $0.5T_d < t_{cmp} \leq 0.75(T_d + T_{min})$, the adjusted comparison value of the modulated wave is $0.5(T_d + T_{min})$ at this time; and
(c) when the original comparison value $t_{cmp}$ of the modulated wave meets $0.75(T_d + T_{min}) < t_{cmp} < T_d + T_{min}$, the adjusted comparison value of the modulated wave is $T_d + T_{min}$ at this time.

As shown in FIG. 5, for the upper switch transistor, an adjusted original comparison value of the modulated wave is only in one of three cases, that is, $0$-$0.5(T_d - T_{min})$, $0.5(T_d + T_{min})$ and $\geq T_d + T_{min}$. When $t_{cmp\_last}$ and $t_{cmp}$ have different values, corresponding turn-on pulses of the upper switch transistor are shown in Table 2.

TABLE 2

| $t_{cmp\_last}$ | $t_{cmp}$ | $t_{cmp\_last} + t_{cmp}$ | Turn-on pulse of upper switch transistor after dead-time is introduced |
|---|---|---|---|
| 0~$0.5(T_d - T_{min})$ | 0~$0.5(T_d - T_{min})$ | $\leq T_d - T_{min}$ | 0 |
| 0~$0.5(T_d - T_{min})$ | $0.5(T_d + T_{min})$ | $\leq T_d$ | 0 |
| 0~$0.5(T_d - T_{min})$ | $\geq T_d + T_{min}$ | $\geq T_d + T_{min}$ | $\geq T_{min}$ |
| $0.5(T_d + T_{min})$ | 0~$0.5(T_d - T_{min})$ | $\leq T_d$ | 0 |
| $0.5(T_d + T_{min})$ | $0.5(T_d - T_{min})$ | $T_d + T_{min}$ | $T_{min}$ |

TABLE 2-continued

| $t_{cmp\_last}$ | $t_{cmp}$ | $t_{cmp\_last} + t_{cmp}$ | Turn-on pulse of upper switch transistor after dead-time is introduced |
|---|---|---|---|
| $0.5(T_d + T_{min})$ | $\geq T_d + T_{min}$ | $\geq T_d + T_{min}$ | $\geq T_{min}$ |
| $\geq T_d + T_{min}$ | $0\sim0.5(T_d - T_{min})$ | $\geq T_d + T_{min}$ | $\geq T_{min}$ |
| $\geq T_d + T_{min}$ | $0.5(T_d + T_{min})$ | $\geq T_d + T_{min}$ | $\geq T_{min}$ |
| $\geq T_d + T_{min}$ | $\geq T_d + T_{min}$ | $\geq T_d + T_{min}$ | $\geq T_{min}$ |

Likewise, it can be verified that $T_d < t_{cmp\_last} + t_{cmp} < T_d + T_{min}$ will not occur (that is, the upper switch transistor will not have a narrow turn-on pulse), regardless of which of the three cases of the values of $t_{cmp\_last}$ and $t_{cmp}$.

Figure 6:
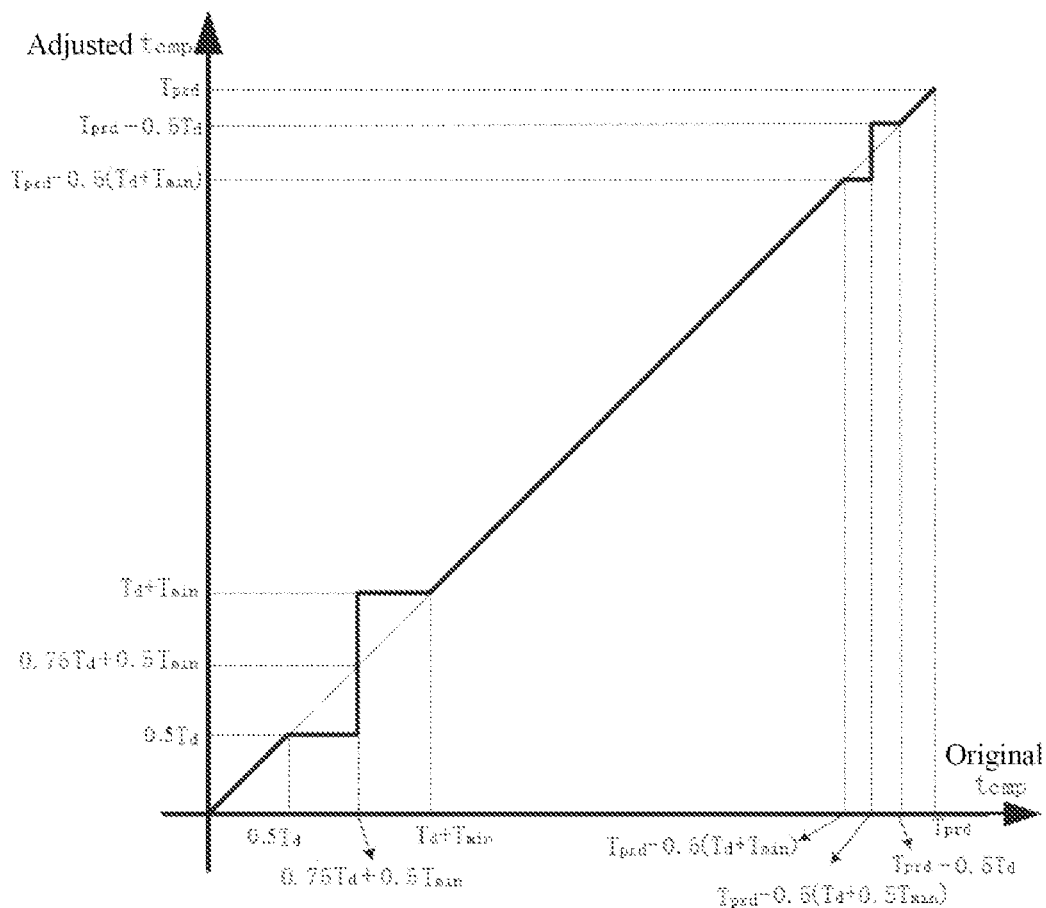
FIG. 6 shows a comparative schematic diagram of a method for suppressing a narrow pulse based on an upper switch transistor in a third adjustment mode according to an embodiment of the present disclosure.

Referring to FIG. 6, based on the method in the above-mentioned embodiment, another exemplary division of a preset narrow pulse interval of the upper switch transistor will be described below. For example, the preset narrow pulse interval of the upper switch transistor includes an interval $(0.5T_d, T_d+T_{min})$, which is denoted by a fourth interval here. Likewise, the term "fourth" of the fourth interval here is only for the convenience of distinguishing division intervals described in different embodiments.

The fourth interval can be divided, for example, into two adjustment intervals of the upper switch transistor, which are respectively $0.5 \ T_d < t_{cmp} < 0.75 \ T_d + 0.5T_{min}$ and $0.75 T_d + 0.5T_{min} \leq t_{cmp} < T_d + T_{min}$. Of course, in other embodiments, the fourth interval may be divided into other number of adjustment intervals of the upper switch transistor or into other range of adjustment intervals of the upper switch transistor, which are not limited herein.

In the above step S110, when it is detected that the original comparison value of the modulated wave in the current cycle is in the fourth interval, it may be determined that the original comparison value of the modulated wave in the current cycle is in the preset narrow pulse interval of the upper switch transistor, and at this time, the original comparison value of the modulated wave in the current cycle is adjusted to avoid the occurrence of narrow pulse in the upper switch transistor.

Therefore, in the above steps S120-S130,
(a) when the original comparison value $t_{cmp}$ of the modulated wave meets $0.5T_d < t_{cmp} < 0.75T_d + 0.5T_{min}$, the adjusted comparison value of the modulated wave is $0.5T_d$ at this time; and
(b) when the original comparison value $t_{cmp}$ of the modulated wave meets $0.75T_d + 0.5T_{min} \leq t_{cmp} < T_d + T_{min}$, the adjusted comparison value of the modulated wave is $T_d + T_{min}$ at this time;

As shown in FIG. 6, for the upper switch transistor, an adjusted original comparison value of the modulated wave is only in one of two cases, that is, $0-0.5T_d$ and $>T_d+T_{min}$. When $t_{cmp\_last}$ and $t_{cmp}$ have different values, corresponding turn-on pulses of the upper switch transistor are shown in Table 3.

TABLE 3

| $t_{cmp\_last}$ | $t_{cmp}$ | $t_{cmp\_last} + t_{cmp}$ | Tun-on pulse of upper switch transistor after dead-time is introduced. |
|---|---|---|---|
| $0\sim0.5T_d$ | $0\sim0.5T_d$ | $\leq T_d$ | 0 |
| $0\sim0.5T_d$ | $\geq T_d + T_{min}$ | $\leq T_d$ | 0 |

TABLE 3-continued

| $t_{cmp\_last}$ | $t_{cmp}$ | $t_{cmp\_last} + t_{cmp}$ | Tun-on pulse of upper switch transistor after dead-time is introduced. |
|---|---|---|---|
| $\geq T_d + T_{min}$ | $0\sim0.5T_d$ | $\geq T_d + T_{min}$ | $\geq T_{min}$ |
| $\geq T_d + T_{min}$ | $\geq T_d + T_{min}$ | $\leq T_d$ | 0 |

Likewise, it can be verified that $T_d < t_{cmp\_last} + t_{cmp} < T_d + T_{min}$ will not occur (that is, the upper switch transistor will not have a narrow turn-on pulse), regardless of which of the three cases of the values of $t_{cmp\_last}$ and $t_{cmp}$.

A narrow pulse avoidance rule of the upper switch transistor according to the embodiment of the present disclosure is only related to the original comparison value of the modulated wave in the current cycle, but is not related to the comparison value of the modulated wave in the previous cycle. After falling into a corresponding adjustment interval, the comparison value of the modulated wave is modified to a specific value, which not only avoids a narrow pulse, but also avoids the situation of adjusting the zero value to a non-zero value. As for the lower switch transistor, because the turn-on time of the lower switch transistor itself depends on the original comparison value of the modulated wave in the current cycle, and will not be affected by the adjacent cycles, the turn-on time can be directly used as the judgment basis and adjustment basis for generating narrow pulses.

Figure 7:
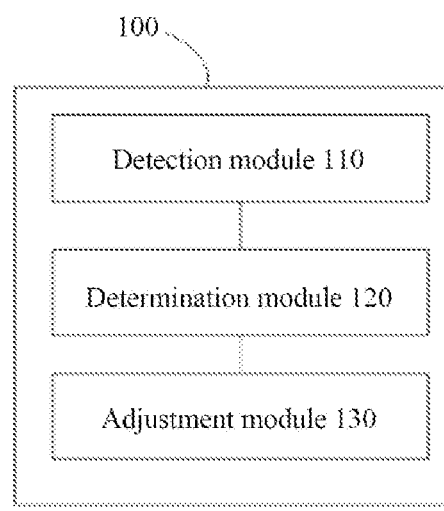
FIG. 7 shows a schematic diagram of a structure of a device for suppressing a narrow pulse according to an embodiment of the present disclosure.

Referring to FIG. 7, based on the method in the embodiments above, an embodiment further provides a device 100 for suppressing a narrow pulse, which is applied to a bridge switching circuit including at least one bridge arm, wherein each of the at least one bridge arm is composed of an upper switch transistor and a lower switch transistor connected in series. The bridge switching circuit generates a driving pulse of the upper switch transistor or the lower switch transistor by using a comparison result of a count value of a triangular carrier and a comparison value of a modulated wave.

In an exemplary embodiment, the device 100 for suppressing a narrow pulse includes a detection module 110, a determination module 120 and an adjustment module 130.

The detection module 110 is configured to detect whether an original comparison value of a modulated wave in a current cycle is within a preset narrow pulse interval of the upper switch transistor, wherein the preset narrow pulse interval of the upper switch transistor includes multiple adjustment intervals of the upper switch transistor obtained by dividing a corresponding value range of the original comparison value of the modulated wave in the current cycle.

The determination module 120 is configured to determine an adjustment interval of the upper switch transistor to which the original comparison value of the modulated wave currently pertains, when the detection module 110 detects that the original comparison value of the modulated wave in the current cycle is within the preset narrow pulse interval of the upper switch transistor.

The adjustment module 130 is configured to adjust the original comparison value of the modulated wave to an adjusted comparison value of the modulated wave corresponding to the adjustment interval of the upper switch transistor to which the original comparison value of the modulated wave currently pertains according to a corresponding relationship between adjustment intervals of the upper switch transistor and adjusted comparison values of the modulated wave.

In an exemplary embodiment, the detection module 110 is further configured to calculate current turn-on time of a lower switch transistor according to the original comparison value of the modulated wave in the current cycle and a maximum value of the triangular carrier when it is detect that the original comparison value of the modulated wave in the current cycle is not within the preset narrow pulse interval of the upper switch transistor in the current cycle, and detect whether the current turn-on time of the lower switch transistor is in a preset narrow pulse interval of the lower switch transistor, wherein the preset narrow pulse interval of the lower switch transistor includes multiple adjustment intervals of the lower switch transistor obtained by dividing a corresponding value range of the turn-on time of the lower switch transistor in the current cycle.

The determination module 120 is further configured to determine an adjustment interval of the lower switch transistor to which the turn-on time of the lower switch transistor currently pertains, when current turn-on time of the lower switch transistor is within the preset narrow pulse interval of the lower switch transistor is detected by the detection module 110.

The adjustment module 130 is further configured to adjust the original comparison value of the modulated wave to an adjusted comparison value of the modulated wave corresponding to the adjustment interval of the lower switch transistor to which the original comparison value of the modulated wave currently pertains according to a corresponding relationship between adjustment intervals of the lower switch transistor and adjusted comparison values of the modulated wave.

It can be understood that the device in the present embodiment corresponds to the method in the above-mentioned embodiment, and alternatives in the above-mentioned embodiment are equally applicable to the present embodiment, so the description thereof will not be repeated herein.

Based on the method in the embodiments above, an embodiment of the present disclosure further provides a device for suppressing a narrow pulse, which is applied to a bridge switching circuit including at least one bridge arm, wherein each of the at least one bridge arm is composed of an upper switch transistor and a lower switch transistor connected in series. The bridge switching circuit generates a driving pulse of the upper switch transistor or the lower switch transistor by using a comparison result of a count value of a triangular carrier and a comparison value of a modulated wave.

In an exemplary embodiment, the device for suppressing a narrow pulse includes a processor, a memory, and a computer program which is stored on the memory and is capable of being executed by the processor, the processor implements the method for suppressing a narrow pulse in the embodiment of the present disclosure when executing the computer program:

detecting whether an original comparison value of a modulated wave in a current cycle is within a preset narrow pulse interval of the upper switch transistor, wherein the preset narrow pulse interval of the upper switch transistor includes multiple adjustment intervals of the upper switch transistor obtained by dividing a corresponding value range of the original comparison value of the modulated wave in the current cycle;

determining an adjustment interval of the upper switch transistor to which the original comparison value of the modulated wave currently pertains when it is detected that the original comparison value of the modulated wave in the current cycle is within the preset narrow pulse interval of the upper switch transistor; and adjusting the original comparison value of the modulated wave to an adjusted comparison value of the modulated wave corresponding to the adjustment interval of the upper switch transistor to which the original comparison value of the modulated wave currently pertains according to a corresponding relationship between adjustment intervals of the upper switch transistor and adjusted comparison values of the modulated wave.

Figure 8:
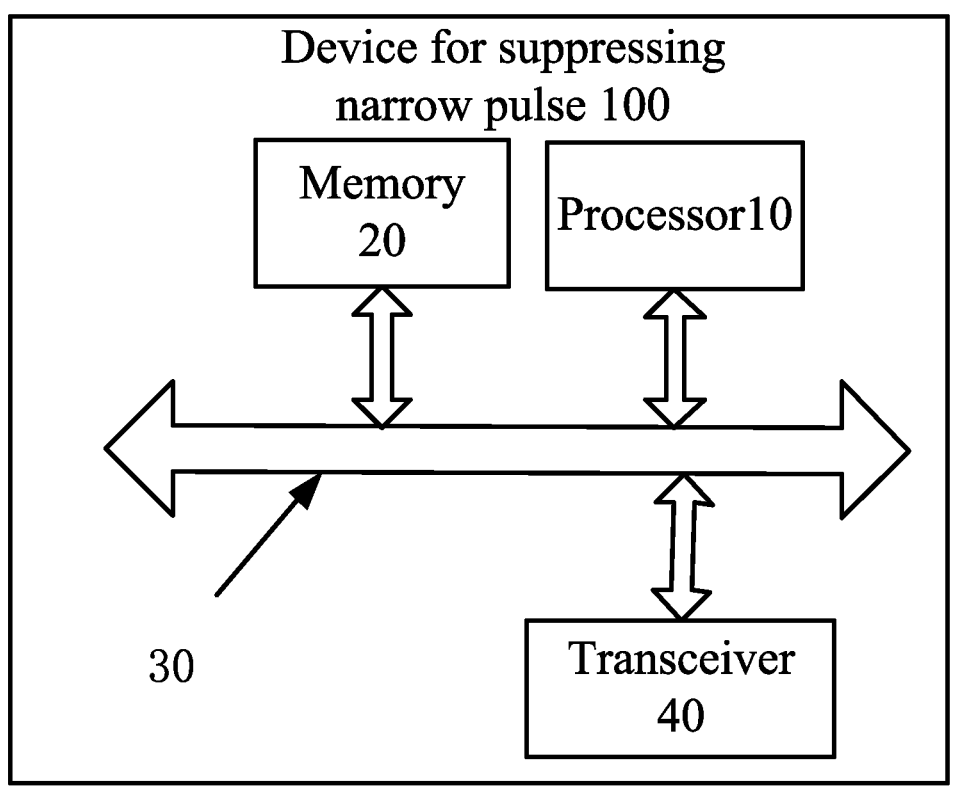
FIG. 8 shows a schematic diagram of a structure of another device for suppressing a narrow pulse according to an embodiment of the present disclosure.

As shown in FIG. 8, in an example, the device 100 for suppressing a narrow pulse may include a processor 10, a memory 20, a bus system 30 and a transceiver 40, wherein the processor 10, the memory 20 and the transceiver 40 are connected by the bus system 30, and the processor 10 executes instructions stored in the memory 20 to control the transceiver 40 to transmit signals.

It should be understood that the processor 10 may be a Central Processing Unit (CPU for short), and the Processor 10 may also be another general purpose processors, a Digital Signal Processor (DSP), an Application Specific Integrated Circuit (ASIC), a Field Programmable Gate Arrays (FPGA) or another programmable logic device, a discrete gate or a transistor logic device, a discrete hardware component, and the like. The general purpose processor may be a microprocessor or the processor may be any conventional processor or the like.

The memory 20 may include a read-only memory and a random access memory and provide instructions and data to processor 10. A portion of the memory 20 may also include a non-volatile random access memory. For example, the memory 20 may also store information on device types.

In addition to a data bus, the bus system 30 may further include a power bus, a control bus, a status signal bus, etc. However, for clarity, all kinds of buses are labeled as a bus system 30 in FIG. 8.

During implementation, processing performed by a terminal device may be accomplished by integrated logic circuitry in a form of hardware in the processor 10 or by instructions in a form of software. That is, the steps in the method disclosed in the embodiment of the present disclosure can be embodied as completion and execution by a hardware processor or completion and execution by a combination of hardware and software modules in the processor. The software module may be located in a random access memory, a flash memory, a read-only memory, a programmable read-only memory, an electrically erasable programmable memory, a register or other storage media. The storage medium is in the memory 20, and the processor 10 reads information in the memory 20 and implements the steps in the above method in combination with its hardware. To avoid repetition, it will not be described in detail here.

An embodiment of the present disclosure further provides a bridge switching circuit, for example, the bridge switching circuit may be a bridge circuit with any phase, including but is not limited to a half-bridge switching circuit, a full-bridge switching circuit, a three-phase bridge switching circuit, a six-phase bridge switching circuit, a nine-phase bridge switching circuit, and the like. For example, the bridge switching circuit includes at least one bridge arm, wherein each bridge arm consists of an upper switch transistor and a lower switch transistor connected in series. In this embodiment, a comparison result of a count value of a triangular carrier and a comparison value of a modulated wave is used by the bridge switching circuit to generate a driving pulse of the upper switch transistor or the lower switch transistor; wherein each bridge arm performs narrow pulse suppression using the method as in the above-mentioned embodiment. The method in the embodiments of the present disclosure can be applied to a bridge circuit with any phase, and the above half-bridge switching circuit, full-bridge switching circuit, three-phase bridge switching circuit, six-phase bridge switching circuit and nine-phase bridge switching circuit are illustrative only and are not exhaustive herein.

An embodiment of the present disclosure further provides a non-transitory computer-readable storage medium, which stores program instructions, and when the program instructions are executed, the method for suppressing a narrow pulse can be implemented. To avoid repetition, it will not be described in detail here.

It can be understood by those of ordinary skills in the art that all or some steps in the method disclosed above and functional modules/units in the system and the device may be implemented as software, firmware, hardware, and proper combinations thereof. In a hardware implementation mode, division of the functional modules/units mentioned in the above description is not always division corresponding to physical components. For example, a physical component may have multiple functions, or multiple physical components may cooperate to execute a function or step. Some or all of the components may be implemented as a software executed by a processor, e.g. a digital signal processor or a microprocessor, or as hardware, or as an integrated circuit, e.g. an application specific integrated circuit. Such software may be distributed on computer-readable media, which may include computer storage media (or non-transient media) and communication media (or transient media). As is well known to those of ordinary skill in the art, the term computer storage medium includes volatile and non-volatile, removable and non-removable media implemented in any method or technique for storing information, such as computer-readable instructions, data structures, program modules, or other data. Computer storage media include, but are not limited to, RAM, ROM, EEPROM, flash memory or other memory technology, CD-ROM, digital versatile disk (DVD) or other optical disk storage, magnetic cartridges, magnetic tapes, magnetic disk storage or other magnetic storage devices, or any other media that may be used to store desired information and may be accessed by a computer. In addition, it is well known to those of ordinary skill in the art that communication media typically contain computer readable instructions, data structures, program modules, or other data in modulated data signals such as carriers or other transmission mechanisms, and may include any information delivery medium.

In several embodiments provided in the present disclosure, it should be understood that the disclosed devices and methods may be implemented in other ways. The device embodiments described above are only illustrative, for example, the flowcharts and block diagrams in the drawings show the architecture, functionality, and operation of possible implementations of the device, methods, and computer program products according to various embodiments of the present disclosure. In addition, functional modules or units in various embodiments of the present disclosure may be integrated together to form an independent part, or individual modules may exist separately, or two or more modules may be integrated to form an independent part.

The foregoing are merely exemplary embodiments of the present disclosure, but the protection scope of the present disclosure is not limited thereto. Anyone skilled in the art may readily conceive variations or substitutions within the technical scope disclosed by the present disclosure, which should be included within the protection scope of the present disclosure.

What is claimed is:

1. A method for suppressing a narrow pulse, applied to a bridge switching circuit comprising at least one bridge arm, each of the bridge arm comprising an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; the method for suppressing the narrow pulse comprises:

detecting whether an original comparison value of the modulated wave in a current cycle is within a preset narrow pulse interval of the upper switch transistor, wherein the preset narrow pulse interval of the upper switch transistor comprises a plurality of adjustment intervals of the upper switch transistor obtained by dividing a corresponding value range of the original comparison value of the modulated wave in the current cycle;

determining an adjustment interval of the upper switch transistor to which the original comparison value of the modulated wave currently pertains when it is detected that the original comparison value of the modulated wave in the current cycle is within the preset narrow pulse interval of the upper switch transistor; and adjusting the original comparison value of the modulated wave to an adjusted comparison value of the modulated wave corresponding to the adjustment interval of the upper switch transistor to which the original comparison value of the modulated wave currently pertains according to a corresponding relationship between the adjustment intervals of the upper switch transistor and adjusted comparison values of the modulated wave.

2. The method for suppressing the narrow pulse according to claim 1, wherein when it is detected that the original comparison value of the modulated wave in the current cycle is not within the preset narrow pulse interval of the upper switch transistor, the method further comprises:

calculating current turn-on time of the lower switch transistor according to the original comparison value of the modulated wave in the current cycle and a maximum value of the triangular carrier, and detecting whether the current turn-on time of the lower switch transistor is within a preset narrow pulse interval of the lower switch transistor, wherein the preset narrow pulse interval of the lower switch transistor comprises a plurality of adjustment intervals of the lower switch transistor obtained by dividing a corresponding value range of the turn-on time of the lower switch transistor in the current cycle;

determining an adjustment interval of the lower switch transistor to which the turn-on time of the lower switch transistor currently pertains when it is detected that the current turn-on time of the lower switch transistor is within the preset narrow pulse interval of the lower switch transistor; and adjusting the original comparison value of the modulated wave to an adjusted comparison value of the modulated wave corresponding to the adjustment interval of the lower switch transistor to which the original comparison value of the modulated wave currently pertains according to a corresponding relationship between the adjustment intervals of the lower switch transistor and adjusted comparison values of the modulated wave.

3. The method for suppressing the narrow pulse according to claim 2, wherein, when the original comparison value of the modulated wave in the current cycle is temp and a maximum count value of the triangular carrier is Tprd, then the turn-on time of the lower switch transistor is 2 (Tprd−tcmp), and the preset narrow pulse interval of the lower switch transistor is (Td, Td+Tmin), where Td is the turn-on-dead-time and Tmin is a minimum turn-on pulse width of the switch transistor.

4. The method for suppressing the narrow pulse according to claim 3, wherein the preset narrow pulse interval of the lower switch transistor is divided into two adjustment intervals of the lower switch transistor;
 determining the adjustment interval of the lower switch transistor to which the turn-on time of the lower switch transistor currently pertains when it is detected that current turn-on time of the lower switch transistor is within the preset narrow pulse interval of the lower switch transistor comprises:
 determining that the turn-on time of the lower switch transistor is within the preset narrow pulse interval of the lower switch transistor when it is detected that the turn-on time of the lower switch transistor in the current cycle is within the interval (Td, Td+Tmin).

5. The method for suppressing the narrow pulse according to claim 4, wherein:
 adjusting the original comparison value of the modulated wave to the adjusted comparison value of the modulated wave corresponding to the adjustment interval of the lower switch transistor to which the original comparison value of the modulated wave currently pertains according to the corresponding relationship between the adjustment intervals of the lower switch transistor and the adjusted comparison values of the modulated wave comprises:
 when the current turn-on time of the lower switch transistor meets Td<2 (Tprd−tcmp)≤Td+0.5Tmin, adjusting the original comparison value of the modulated wave to be Tprd−0.5Td; and
 when the current turn-on time of the lower switch transistor meets Td+0.5Tmin<2 (Tprd−tcmp)<Td+Tmin, adjusting the original comparison value of the modulated wave to be Tprd−0.5 (Td+Tmin).

6. The method for suppressing the narrow pulse according to claim 2, further comprising selecting a corresponding adjusted comparison value of the modulated wave for an adjustment interval of the upper switch transistor, which comprises:
 selecting a value which is closest to the original comparison value of the modulated wave in the current cycle for the adjustment interval of the upper switch transistor, wherein a sum of the value and a comparison value of the modulated wave in an adjacent cycle is not within an interval (Td, Td+Tmin), where Td is turn-on-dead-time and Tmin is a minimum turn-on pulse width of the switch transistor.

7. The method for suppressing the narrow pulse according to claim 1, further comprising selecting a corresponding adjusted comparison value of the modulated wave for an adjustment interval of the upper switch transistor, which comprises:
 selecting a value which is closest to the original comparison value of the modulated wave in the current cycle for the adjustment interval of the upper switch transistor, wherein a sum of the value and a comparison value of the modulated wave in an adjacent cycle is not within an interval (Td, Td+Tmin), where Td is turn-on-dead-time and Tmin is a minimum turn-on pulse width of the switch transistor.

8. The method for suppressing the narrow pulse according to claim 1, wherein the preset narrow pulse interval of the upper switch transistor comprises a first interval (1, 0.5 (Td+Tmin)) and a second interval (Td−1, Td+Tmin), where Td is turn-on-dead-time, Tmin is a minimum turn-on pulse width of the switch transistor, and Td≥Tmin+2; the first interval and the second interval are divided into four adjustment intervals of the upper switch transistor;
 determining the adjustment interval of the upper switch transistor to which the original comparison value of the modulated wave currently pertains when it is detected that the original comparison value of the modulated wave in the current cycle is within the preset narrow pulse interval of the upper switch transistor comprises:
 determining that the original comparison value of the modulated wave is in the preset narrow pulse interval of the upper switch transistor when it is detected that the original comparison value of the modulated wave in the current cycle is in the first interval or the second interval.

9. The method for suppressing the narrow pulse according to claim 8, wherein:
 adjusting the original comparison value of the modulated wave to the adjusted comparison value of the modulated wave corresponding to the adjustment interval of the upper switch transistor to which the original comparison value of the modulated wave currently pertains according to the corresponding relationship between the adjustment intervals of the upper switch transistor and the adjusted comparison values of the modulated wave comprises:
 when the original comparison value temp of the modulated wave meets 1<tcmp<0.25 (Td+Tmin), adjusting the original comparison value of the modulated wave to be 1;
 when the original comparison value tcmp of the modulated wave meets 0.25 (Td+Tmin)≤tcmp<0.5 (Td+Tmin), adjusting the original comparison value of the modulated wave to be 0.5 (Td+Tmin);
 when the original comparison value temp of the modulated wave meets Td−1<tcmp<Td+0.5Tmin, adjusting the comparison value of the modulated wave to be Td−1; and
 when the original comparison value temp of the modulated wave meets Td+0.5Tmin≤tcmp<Td+Tmin, adjusting the original comparison value of the modulated wave to be Td+Tmin.

10. The method for suppressing the narrow pulse according to claim 1, wherein the preset narrow pulse interval of the upper switch transistor comprises a third interval (0.5 (Td−Tmin), Td+Tmin), where Td is turn-on-dead-time, Tmin is a minimum turn-on pulse width of the switch transistor, and Td≥Tmin+2; the third interval is divided into three adjustment intervals of the upper switch transistor;
 determining the adjustment interval of the upper switch transistor to which the original comparison value of the modulated wave currently pertains when it is detected that the original comparison value of the modulated wave in the current cycle is within the preset narrow pulse interval of the upper switch transistor comprises:
 determining that the original comparison value of the modulated wave is in the preset narrow pulse interval of the upper switch transistor when it is detected that the original comparison value of the modulated wave in the current cycle is in the third interval.

11. The method for suppressing the narrow pulse according to claim 10, wherein:

adjusting the original comparison value of the modulated wave to the adjusted comparison value of the modulated wave corresponding to the adjustment interval of the upper switch transistor to which the original comparison value of the modulated wave currently pertains according to the corresponding relationship between the adjustment intervals of the upper switch transistor and the adjusted comparison values of the modulated wave comprises:

when the original comparison value temp of the modulated wave meets 0.5 (Td−Tmin)<tcmp≤0.5Td, adjusting the original comparison value of the modulated wave to be 0.5 (Td−Tmin);

when the original comparison value temp of the modulated wave meets 0.5Td<tcmp≤0.75 (Td+Tmin), adjusting the original comparison value of the modulated wave to be 0.5(Td+Tmin); and when the original comparison value temp of the modulated wave meets 0.75 (Td+Tmin)≤tcmp<Td+Tmin, adjusting the original comparison value of the modulated wave to be Td+Tmin.

12. The method for suppressing the narrow pulse according to claim 1, wherein the preset narrow pulse interval of the upper switch transistor comprises a fourth interval (0.5Td, Td+Tmin), where Td is turn-on-dead-time, Tmin is a minimum turn-on pulse width of the switch transistor, and Td≥Tmin+2; the fourth interval is divided into two adjustment intervals of the upper switch transistor;

determining the adjustment interval of the upper switch transistor to which the original comparison value of the modulated wave currently pertains when it is detected that the original comparison value of the modulated wave in the current cycle is within the preset narrow pulse interval of the upper switch transistor comprises:

determining the original comparison value of the modulated wave is in the preset narrow pulse interval of the upper switch transistor when it is detected that the original comparison value of the modulated wave in the current cycle is in the fourth interval.

13. The method for suppressing the narrow pulse according to claim 12, wherein:

adjusting the original comparison value of the modulated wave to the adjusted comparison value of the modulated wave corresponding to the adjustment interval of the upper switch transistor to which the original comparison value of the modulated wave currently pertains according to the corresponding relationship between the adjustment intervals of the upper switch transistor and the adjusted comparison values of the modulated wave comprises:

when the original comparison value temp of the modulated wave meets 0.5Td<tcmp<0.75Td+0.5Tmin, adjusting the comparison value of the modulated wave to be 0.5Td; and when the original comparison value temp of the modulated wave meets 0.75Td+0.5Tmin≤tcmp<Td+Tmin, adjusting the original comparison value of the modulated wave to be Td+Tmin.

14. A device for suppressing a narrow pulse, applied to a bridge switching circuit comprising at least one bridge arm, wherein each of the bridge arm comprises an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; the device comprises a processor and a memory storing a computer program that is capable of being run on the processor, wherein the processor implements steps in the method for suppressing a narrow pulse according to claim 1 when executing the program.

15. A bridge switching circuit, comprising at least one bridge arm, wherein each of the at least one bridge arm comprises an upper switch transistor and a lower switch transistor connected in series; the bridge switching circuit uses a comparison result of a count value of a triangular carrier and a comparison value of a modulated wave to generate a driving pulse of the upper switch transistor or the lower switch transistor; wherein each of the at least one bridge arm performs narrow pulse suppression using the method according to claim 1.

16. The bridge switching circuit according to claim 15, wherein the bridge switching circuit comprises a half-bridge switching circuit, a full-bridge switching circuit, a three-phase bridge switching circuit, a six-phase bridge switching circuit, or a nine-phase bridge switching circuit.

* * * * *